(12) United States Patent
Beers et al.

(10) Patent No.: US 11,754,088 B2
(45) Date of Patent: Sep. 12, 2023

(54) FAN IMPELLER WITH THIN BLADES

(71) Applicant: Hamilton Sundstrand Corporation, Charlotte, NC (US)

(72) Inventors: Craig M. Beers, Wethersfield, CT (US); John Perella, Monson, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/541,369

(22) Filed: Dec. 3, 2021

(65) Prior Publication Data

US 2023/0175521 A1   Jun. 8, 2023

(51) Int. Cl.
| F04D 29/28 | (2006.01) |
| F04D 29/30 | (2006.01) |
| F04D 29/54 | (2006.01) |
| F04D 29/24 | (2006.01) |
| B64D 13/00 | (2006.01) |
| F04D 3/02 | (2006.01) |
| B64D 13/06 | (2006.01) |

(52) U.S. Cl.
CPC ........... *F04D 29/281* (2013.01); *B64D 13/00* (2013.01); *F04D 3/02* (2013.01); *F04D 29/24* (2013.01); *F04D 29/242* (2013.01); *F04D 29/245* (2013.01); *F04D 29/28* (2013.01); *F04D 29/30* (2013.01); *F04D 29/544* (2013.01); *B64D 2013/0688* (2013.01); *F05D 2240/304* (2013.01); *F05D 2250/74* (2013.01); *F05D 2300/173* (2013.01)

(58) Field of Classification Search
CPC .......... F04D 29/281; F04D 3/02; F04D 29/24; F04D 29/242; F04D 29/245; F04D 29/28; F04D 29/30; F04D 29/544; B64D 13/00; B64D 2013/0688; F05D 2240/304; F05D 2250/74; F05D 2300/173

See application file for complete search history.

(56) References Cited

U.S. PATENT DOCUMENTS

| 3,363,832 | A | * | 1/1968 | Groff | F04D 29/30 |
| | | | | | 416/186 A |
| 4,312,191 | A | | 1/1982 | Biagini | |
| 7,419,359 | B2 | * | 9/2008 | Spaggiari | F04D 29/329 |
| | | | | | 416/169 A |
| 7,438,522 | B2 | * | 10/2008 | Eimer | F04D 29/164 |
| | | | | | 416/243 |

(Continued)

FOREIGN PATENT DOCUMENTS

| CN | 113374731 A | 9/2021 |
| EP | 1312807 A2 | 5/2003 |
| WO | 2012/072996 A1 | 6/2012 |

OTHER PUBLICATIONS

European Search Report for EP Application No. 22211081.9 dated Apr. 24, 2023.

*Primary Examiner* — Brian Christopher Delrue
(74) *Attorney, Agent, or Firm* — Carlson, Gaskey & Olds, P.C.

(57) ABSTRACT

An impeller for use in a fan system includes a hub extending along an axis of rotation and having a hub outer surface. There also are a plurality of blades extending radially outwardly of the hub outer surface. The blades have a unique cross-section at several different locations that result in relatively thin blades. A fan system and method are also disclosed.

20 Claims, 3 Drawing Sheets

(56) References Cited

U.S. PATENT DOCUMENTS

| | | | |
|---|---|---|---|
| 7,757,502 B2 | 7/2010 | Merritt et al. | |
| 9,103,568 B2 | 8/2015 | Beers et al. | |
| 10,605,269 B2 * | 3/2020 | Stadler | F04D 29/164 |
| 10,697,467 B2 * | 6/2020 | Froh | F04D 29/384 |
| 11,149,742 B2 * | 10/2021 | Honma | F24F 1/38 |
| 11,421,704 B2 * | 8/2022 | Gruber | F04D 29/30 |
| 2011/0142611 A1 * | 6/2011 | Kato | F04D 29/544 |
| | | | 415/206 |
| 2018/0328196 A1 * | 11/2018 | Brozyna | F01D 9/041 |
| 2018/0363661 A1 * | 12/2018 | Larpent | F04D 29/384 |
| 2019/0216281 A1 * | 7/2019 | Park | A47L 9/1409 |

\* cited by examiner

FAN IMPELLER WITH THIN BLADES

BACKGROUND OF THE INVENTION

This application relates to an impeller for a fan wherein the fan blades are relatively thin compared to existing impellers.

Fan are utilized in any number of applications, and typically have a motor driving an impeller. The impeller has a plurality of blades which are driven to rotate and move a gas from an inlet to an outlet.

One application for such a system is in a cabin air recirculation system for use on an aircraft. In this application, the fan receives air from an aircraft cabin, and recirculates it back into the cabin.

Existing fan impellers in many such systems have been formed as a cast item which is relatively heavy.

SUMMARY OF THE INVENTION

An impeller for use in a fan system includes a hub extending along an axis of rotation and having a hub outer surface. A dimension X is measured along the axis of rotation, a radial dimension Z is defined in the radial dimension, and a Y axis is defined laterally and perpendicular to the Z axis, and spaced by 90 degrees from the Z axis. There are also nine blades extending radially outwardly of the hub outer surface, and having a first cross-sectional contour and height at the hub outer surface as shown below, having a dimension Xs measured in the X direction and perpendicular to a Y axis and to a suction side and a dimension Xp measured in the Y direction perpendicular to the X axis and to a pressure side and a dimension Ys measured in the Y direction and perpendicular to the X axis to the suction side and a dimension Zp in the Z dimension in a radial dimension from the centerline to the pressure side and a dimension Zs measured in the same direction and to the suction side, and having the following dimensions with there being an origin for each of the nine blades. All the origins are at a common location along the X axis, and at nine equally circumferentially spaced locations, with a point A defined at a leading edge, a point B being the closest point to the Y axis, and spaced from the leading edge, a point C being the closest point to the X axis, and spaced from the leading edge, and point D being at a trailing edge:

| Point No. | XP | YP | ZP |
| --- | --- | --- | --- |
| A | 0.3365 | −0.0643 | 0.9889 |
| B | 0.3568 | −0.5000 | 0.9945 |
| C | 0.3732 | −0.0489 | 1.0013 |
| D | 2.5986 | −2.2174 | 1.2400 |

| Point No. | XS | YS | ZS |
| --- | --- | --- | --- |
| A | 0.3365 | −0.0643 | 0.9889 |
| B | 0.3274 | −0.0878 | 0.9903 |
| C | 0.3298 | −0.1047 | 0.9951 |
| D | 2.5986 | −2.2174 | 1.2400 |

There is a second cross-sectional contour spaced from the hub outer surface in a radially outer direction having the following dimensions:

| Point No. | XP | YP | ZP |
| --- | --- | --- | --- |
| A | 0.2792 | −0.0541 | 1.3143 |
| B | 0.2960 | −0.0415 | 1.3262 |
| C | 0.3098 | −0.0399 | 1.3358 |
| D | 2.3186 | −2.1718 | 1.6250 |

| Point No. | XS | YS | ZS |
| --- | --- | --- | --- |
| A | 0.2792 | −0.0541 | 1.3143 |
| B | 0.2713 | −0.0756 | 1.3078 |
| C | 0.2733 | −0.0921 | 1.3081 |
| D | 2.3186 | −2.1718 | 1.6250 |

All of the dimensions measured above have a tolerance in the range of +/−0.020 inch (+/−0.0508 cm).

A fan system and a method of replacing a fan impeller are also disclosed.

These and other features of the present invention can be best understood from the following specification and drawings, the following of which is a brief description.

DETAILED DESCRIPTION

Figure 1:
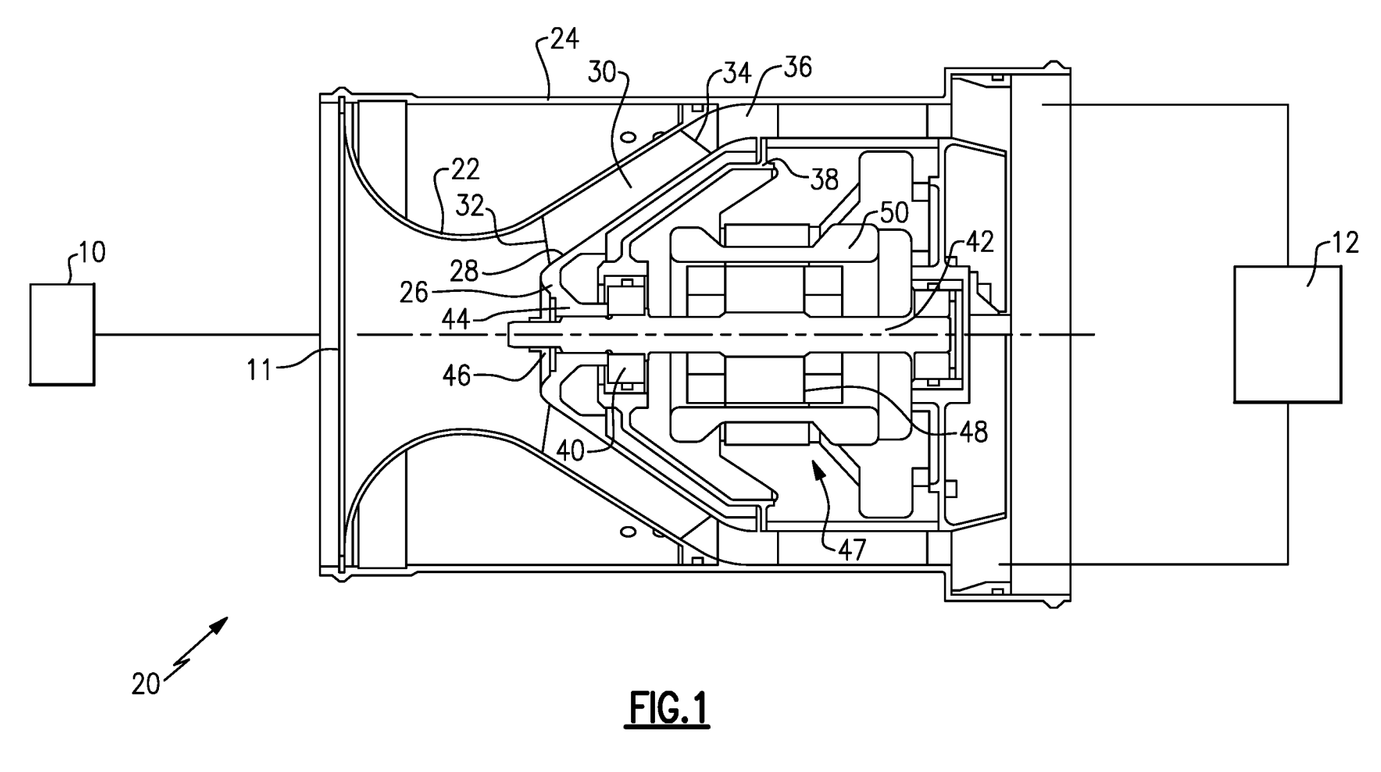
FIG. 1 shows a fan and motor system.

FIG. 1 shows a fan system 20. A source 10 delivers gas to an inlet 11 in a fan housing 22. The gas may be air. The air approaches an impeller 26 having a hub outer diameter at 28 and a plurality of fan blades 30 having a leading edge 32 and a trailing edge 34. A diffuser housing 38 is aft of the impeller 26. An electric motor 47 has a rotor 48 and a stator 50. The rotor 48 is driven to rotate, as known, and drives a shaft 42. Shaft 42 is secured to impeller 26 with a connection shown at 44, and including a nut 46. A bearing 40 supports the shaft 42. Impeller 26 moves air to outlet 36. In one application source 10 is an aircraft cabin that recirculates air back into a use 12 that may be the cabin. In such an application, the air is treated, such as by filtering, and then delivered into a mixing chamber where it is mixed with air from an air cycle machine. The mixed air is returned to the aircraft cabin.

Figure 2A:
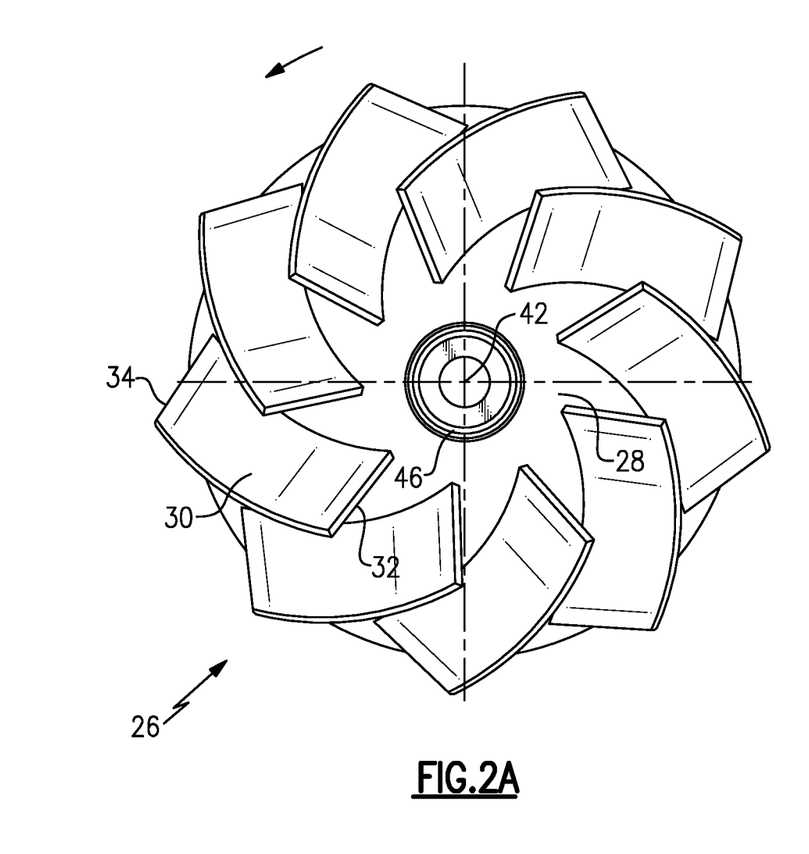
FIG. 2A is a front view of a fan impeller according to this disclosure.

FIG. 2A shows the impeller 26 with the shaft 42 and bolt connection 46. There are nine blades 30 in one embodiment. Each of the blades has a leading edge 32 and a trailing edge 34.

Figure 2B:
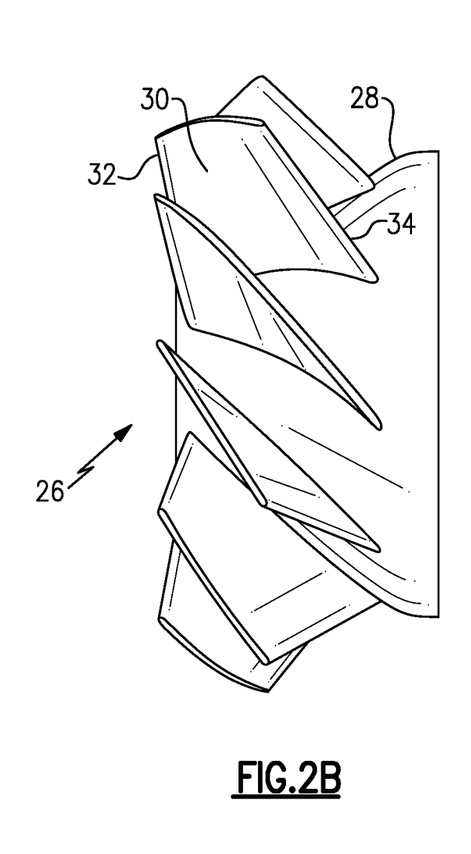
FIG. 2B is a side view of the FIG. 2A impeller.

FIG. 2B is a side view showing the hub structure 28 mounting the blades 30.

Figure 3:
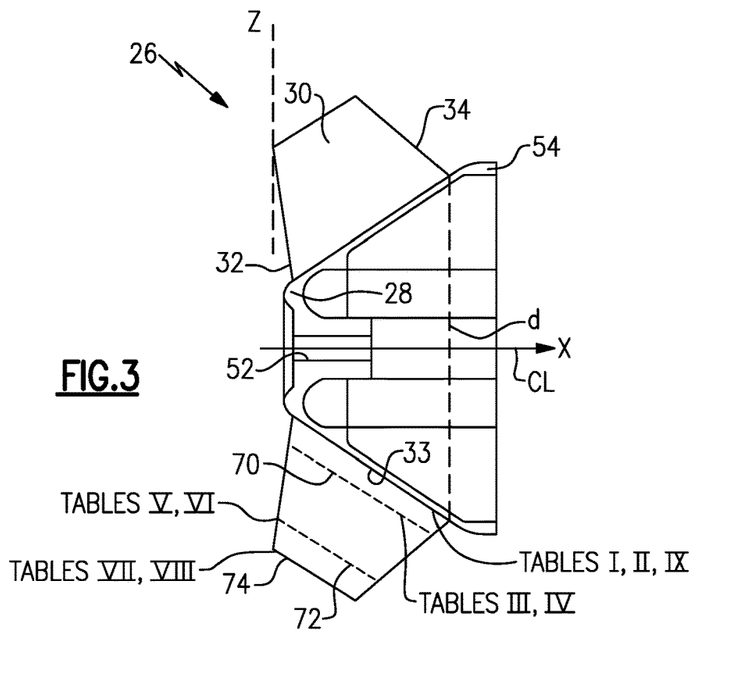
FIG. 3 is a cross-sectional view through a disclosed impeller.

FIG. 3 is a cross-sectional view through the impeller 26. As can be seen, there is a bore 52 to receive the shaft. There is a centerline CL. An outer surface 33 of the hub 28 is defined. A cross-section 70 of the blades 30 may be defined as next to the hub. Another cross-section 72 may be defined as next to the tip, and there is a tip cross-section 74. A diameter d is shown to the outer surface 33 of the hub. As can be appreciated from this view, the diameter d would vary along the surface 33. A dimension Z is defined radially outwardly from the centerline CL and a dimension X is defined along the centerline CL.

Figure 4:
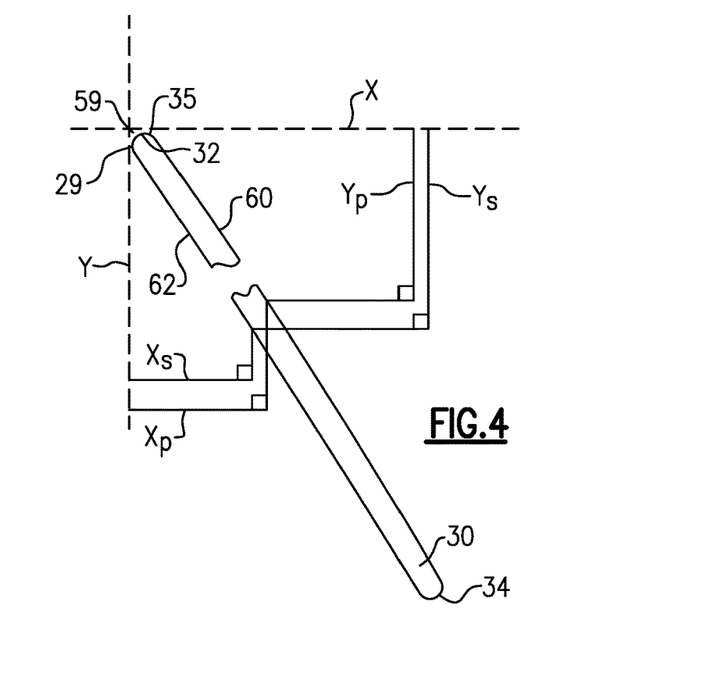
FIG. 4 is a cross-section view through a blade on the impeller.

FIG. 4 shows a cross-section of each blade 30 as would be found at surface 33, and cross-sections 70 and 72, and 74.

A dimension Y is defined laterally and perpendicular to the Z axis, and spaced by 90 degrees from the Z axis. Dimensions X and Y are taken from an origin point 59. There is a suction side 62 and a pressure side 60 of blade 30. Dimensions Yp and Ys are shown measured from the axis X in the Y direction and two points on the suction side 62 and pressure side 60. Similarly, dimensions Xs and Xp are measured in the X direction from the Y axis and respectively to a point on the suction side 62 and to a point on the suction side 60. The dimensions Zp and Zs are taken in the Z direction to the point in question at each of the pressure 60 and suction 62 sides. These distances will vary along a length of the fan cross-sections at each cross-section 33, 70, 72 and 74.

Point 32 is at a leading edge. Point 29 is the closest point to the Y axis, and spaced from the leading edge. Point 35 is the closest point to the X axis, and spaced from the leading edge. Point 34 is at the trailing edge.

Note, for each of the nine blades 30 there is an origin 59. The origins are all at a common distance all the X dimensions. The Z and Y origin locations are at nine equally circumferentially spaced locations.

TABLE I

AT 33

| Point No. | XP | YP | ZP |
|---|---|---|---|
| 32 | 0.3365 | −0.0643 | 0.9889 |
| 29 | 0.3568 | −0.5000 | 0.9945 |
| 35 | 0.3732 | −0.0489 | 1.0013 |
| 34 | 2.5986 | −2.2174 | 1.2400 |

The following dimensions in ach of the supplemental tables will also be found spaced between points 29 or 35 and point 34.

TABLE I

SUPPLEMENTAL AT 33

| XP | YP | ZP |
|---|---|---|
| 0.4104 | −0.0744 | 1.0230 |
| 0.5038 | −0.1533 | 1.0774 |
| 0.6892 | −0.3110 | 1.1723 |
| 1.1829 | −0.7495 | 1.3528 |
| 1.6731 | −1.2210 | 1.4292 |
| 2.1523 | −1.7087 | 1.3958 |
| 2.4413 | −2.0064 | 1.3243 |
| 2.5550 | −2.1228 | 1.2858 |
| 2.6094 | −2.1837 | 1.2620 |

TABLE II

AT 33

| Point No. | XS | YS | ZS |
|---|---|---|---|
| 32 | 0.3365 | −0.0643 | 0.9889 |
| 29 | 0.3274 | −0.0878 | 0.9903 |
| 35 | 0.3298 | −0.1047 | 0.9951 |
| 34 | 2.5986 | −2.2174 | 1.2400 |

TABLE II

SUPPLEMENTAL AT 33

| XS | YS | ZS |
|---|---|---|
| 0.3613 | −0.1371 | 1.0156 |
| 0.4544 | −0.2156 | 1.0687 |
| 0.6392 | −0.3724 | 1.1612 |
| 1.1312 | −0.8080 | 1.3350 |
| 1.6198 | −1.2753 | 1.4044 |
| 2.0972 | −1.7575 | 1.3644 |
| 2.3850 | −2.0514 | 1.2895 |
| 2.4982 | −2.1662 | 1.2498 |
| 2.5587 | −2.2215 | 1.2297 |

TABLE III

AT 70

| Point No. | XP | YP | ZP |
|---|---|---|---|
| 32 | 0.2792 | −0.0541 | 1.3143 |
| 29 | 0.2960 | −0.0415 | 1.3262 |
| 35 | 0.3098 | −0.0399 | 1.3358 |
| 34 | 2.3186 | −2.1718 | 1.6250 |

TABLE III

SUPPLEMENTAL AT 70

| XP | YP | ZP |
|---|---|---|
| 0.3437 | −0.0635 | 1.3581 |
| 0.4284 | −0.1411 | 1.4106 |
| 0.5959 | −0.2965 | 1.5035 |
| 1.0403 | −0.7288 | 1.6860 |
| 1.4810 | −1.1931 | 1.7748 |
| 1.9118 | −1.6747 | 1.7655 |
| 2.1717 | −1.9709 | 1.7136 |
| 2.2740 | −2.0874 | 1.6838 |
| 2.3187 | −2.1471 | 1.6576 |

TABLE IV

AT 70

| Point No. | XS | YS | ZS |
|---|---|---|---|
| 32 | 0.2792 | −0.0541 | 1.3143 |
| 29 | 0.2713 | −0.0756 | 1.3078 |
| 35 | 0.2733 | −0.0921 | 1.3081 |
| 34 | 2.3186 | −2.1718 | 1.6250 |

TABLE IV

SUPPLEMENTAL AT 70

| XS | YS | ZS |
|---|---|---|
| 0.3024 | −0.1245 | 1.3255 |
| 0.3878 | −0.2018 | 1.3751 |
| 0.5565 | −0.3563 | 1.4627 |
| 1.0036 | −0.7843 | 1.6331 |
| 1.4465 | −1.2422 | 1.7117 |
| 1.8793 | −1.7160 | 1.6936 |
| 2.1403 | −2.0069 | 1.6374 |
| 2.2430 | −2.1212 | 1.6061 |
| 2.2974 | −2.1772 | 1.5933 |

TABLE V

AT 72

| Point No. | XP | YP | ZP |
|---|---|---|---|
| 32 | 0.0648 | −0.0158 | 2.5318 |
| 29 | 0.0805 | −0.0081 | 2.5416 |
| 35 | 0.0924 | −0.0097 | 2.5490 |
| 34 | 1.4994 | −2.0383 | 2.7512 |

TABLE V

SUPPLEMENTAL AT 72

| XP | YP | ZP |
|---|---|---|
| 0.1178 | −0.0348 | 2.5646 |
| 0.1785 | −0.1131 | 2.6001 |
| 0.2969 | −0.2689 | 2.6627 |
| 0.6062 | −0.6930 | 2.7836 |
| 0.9122 | −1.1324 | 2.8415 |
| 1.2149 | −1.5780 | 2.8378 |
| 1.3997 | −1.8511 | 2.8064 |
| 1.4726 | −1.9589 | 2.7879 |
| 1.5062 | −2.0145 | 2.7738 |

TABLE VI

AT 72

| Point No. | XS | YS | ZS |
|---|---|---|---|
| 32 | 0.0648 | −0.0158 | 2.5318 |
| 29 | 0.0555 | −0.0323 | 2.5259 |
| 35 | 0.0558 | −0.0462 | 2.5258 |
| 34 | 1.4994 | −2.0383 | 2.7512 |

TABLE VI

SUPPLEMENTAL AT 72

| XS | YS | ZS |
|---|---|---|
| 0.0754 | −0.0777 | 2.5372 |
| 0.1363 | −0.1554 | 2.5716 |
| 0.2551 | −0.3101 | 2.6320 |
| 0.5655 | −0.7306 | 2.7478 |
| 0.8725 | −1.1658 | 2.8012 |
| 1.1759 | −1.6068 | 2.7936 |
| 1.3609 | −1.8769 | 2.7601 |
| 1.4344 | −1.9834 | 2.7413 |
| 1.4737 | −2.0359 | 2.7330 |

TABLE VII

AT 74

| Point No. | XP | YP | ZP |
|---|---|---|---|
| 32 | 0.0120 | −0.0064 | 2.8313 |
| 29 | 0.0295 | 0.0000 | 2.8356 |
| 35 | 0.0418 | −0.0026 | 2.8401 |
| 34 | 1.2984 | −2.0055 | 3.0276 |

TABLE VII

SUPPLEMENTAL AT 74

| XP | YP | ZP |
|---|---|---|
| 0.0648 | −0.0295 | 2.8530 |
| 0.1193 | −0.1076 | 2.8851 |
| 0.2253 | −0.2629 | 2.9414 |
| 0.5005 | −0.6840 | 3.0495 |
| 0.7733 | −1.1173 | 3.1008 |
| 1.0455 | −1.5540 | 3.0979 |
| 1.2126 | −1.8212 | 3.0707 |
| 1.2790 | −1.9267 | 3.0547 |
| 1.3102 | −1.9814 | 3.0437 |

TABLE VIII

AT 74

| Point No. | XS | YS | ZS |
|---|---|---|---|
| 32 | 0.0120 | −0.0064 | 2.8313 |
| 29 | 0.0012 | −0.0220 | 2.8311 |
| 35 | 0.0000 | −0.0350 | 2.8334 |
| 34 | 1.2984 | −2.0055 | 3.0276 |

TABLE VIII

SUPPLEMENTAL AT 74

| XS | YS | ZS |
|---|---|---|
| 0.0177 | −0.0658 | 2.8452 |
| 0.0722 | −0.1437 | 2.8763 |
| 0.1783 | −0.2984 | 2.9304 |
| 0.4538 | −0.7176 | 3.0323 |
| 0.7271 | −1.1480 | 3.0780 |
| 0.9995 | −1.5813 | 3.0707 |
| 1.1667 | −1.8463 | 3.0412 |
| 1.2331 | −1.9508 | 3.0245 |
| 1.2694 | −2.0024 | 3.0166 |

In addition, Table 9 reproduced below shows the X dimension along the hub and the Z dimension to the outer surface of the hub, and at the surface 33.

TABLE IX

AT 33

| Point No. | X | Z |
|---|---|---|
| 1 | 0.3343 | 0.5800 |
| 3 | 0.2952 | 0.6167 |
| 6 | 0.2269 | 0.7005 |
| 9 | 0.2110 | 0.8497 |
| 12 | 0.5521 | 1.1387 |
| 15 | 1.3384 | 1.6773 |
| 18 | 2.1246 | 2.2159 |
| 21 | 2.7422 | 2.6317 |
| 24 | 2.9848 | 2.7235 |
| 27 | 3.1657 | 2.7481 |
| 30 | 3.2940 | 2.7500 |

All of the above dimensions have a tolerance of +/−0.020 inch (+/−0.0508 cm).

In the past, fan impellers for use in cabin air recirculation systems have been generally cast and thus heavy. Impeller 26 may be machined from a metal, and thus is more lightweight. In one application, the impeller 26 may be formed of Aluminum 60/61™ alloy. Aluminum 60/61™ alloy is an aluminum alloy containing at least magnesium and silicone.

In a unique benefit from this disclosure, an initial impeller may be made to each of the nine tables above, thus including the dimensions for the cross-sections at 33, 70, 72 and 74. However, subsequently, the fan blades may be cut away such that they do not extend as far radially outwardly for certain applications. It is presently envisioned that as many as three distinct impellers may be produced from the one initial impeller block. In the initial block, it could be said that cross-section 70 is between 20 and 30% of the entire maximum distance between the surface 33 and the tip 74. In one application it is at 25%. Similarly, the cross-section 72 may be between 70 and 80% of the maximum radius. In one embodiment, it is measured at 75%.

Note that the origin for all of the above tables have an X location selected at the leading edge 32 of the cross-section in Table VIII.

The uniquely contoured blades provide efficient operation in a long lived and light weight impeller.

Although an impeller has been disclosed, a worker of skill in this art would recognize that certain modifications would come within the scope of this disclosure. For that reason, the following claims should be cited to determine the true scope and content.

What is claimed is:

1. An impeller for use in a fan system comprising:
a hub extending along an X axis of rotation and having a hub outer surface;
a dimension X measured along the X axis of rotation defining a centerline, a radial dimension Z defining a Z axis in the radial dimension Z, and a Y axis defined laterally and perpendicular to the Z axis, and spaced by 90 degrees from the Z axis,
further comprising nine blades extending radially outwardly of the hub outer surface, and having a first cross-sectional contour and height at the hub outer surface as defined below, having a dimension Xs measured in the X direction and perpendicular to the Y axis and to a suction side and a dimension Xp measured in the X direction and perpendicular to the Y axis and to a pressure side and a dimension Yp measured in the Y direction perpendicular to the X axis and to a pressure side and a dimension Ys measured in the Y direction and perpendicular to the X axis to the suction side and a dimension Zp in the Z dimension in the radial dimension from the centerline to the pressure side and a dimension Zs measured in the Z direction and to the suction side, with there being an origin for each of the nine blades, and all said origins being at a common location along the X axis, and at nine equally circumferentially spaced locations, with a point A defined at a leading edge, a point B being the closest point to the Y axis, and spaced from the leading edge, a point C being the closest point to the X axis, and spaced from the leading edge, and a point D being at a trailing edge, and having the following dimensions:

| Point No. | XP | YP | ZP |
|---|---|---|---|
| A | 0.3365 | −0.0643 | 0.9889 |
| B | 0.3568 | −0.5000 | 0.9945 |
| C | 0.3732 | −0.0489 | 1.0013 |
| D | 2.5986 | −2.2174 | 1.2400 |

| Point No. | XS | YS | ZS |
|---|---|---|---|
| A | 0.3365 | −0.0643 | 0.9889 |
| B | 0.3274 | −0.0878 | 0.9903 |
| C | 0.3298 | −0.1047 | 0.9951 |
| D | 2.5986 | −2.2174 | 1.2400 | further, there being a second cross-sectional contour spaced from the hub outer surface in a radially outer direction having the following dimensions:

| Point No. | XP | YP | ZP |
|---|---|---|---|
| A | 0.2792 | −0.0541 | 1.3143 |
| B | 0.2960 | −0.0415 | 1.3262 |
| C | 0.3098 | −0.0399 | 1.3358 |
| D | 2.3186 | −2.1718 | 1.6250 |

| Point No. | XS | YS | ZS |
|---|---|---|---|
| A | 0.2792 | −0.0541 | 1.3143 |
| B | 0.2713 | −0.0756 | 1.3078 |
| C | 0.2733 | −0.0921 | 1.3081 |
| D | 2.3186 | −2.1718 | 1.6250 | all of the dimensions measured above having a tolerance in the range of +/−0.020 inch (+/0.0508 cm).

2. The impeller as set forth in claim 1, wherein the hub having an outer diameter along the hub outer surface with a first point taken at an axially forwardmost point, and measured in eleven spaced data points and having X and Z dimensions as follows:

| Point No. | X | Z |
|---|---|---|
| 1 | 0.3343 | 0.5800 |
| 2 | 0.2952 | 0.6167 |
| 3 | 0.2269 | 0.7(H)5 |
| 4 | 0.2110 | 0.8497 |
| 5 | 0.5521 | 1.1387 |
| 6 | 1.3384 | 1.6773 |
| 7 | 2.1246 | 2.2159 |
| 8 | 2.7422 | 2.6317 |
| 9 | 2.9848 | 2.7235 |
| 10 | 3.1657 | 2.7481 |
| 11 | 3.2940 | 2.7500 | all of the dimensions measured above having a tolerance in the range of +/−0.020 inch (+/0.0508 cm).

3. The impeller as set forth in claim 1, wherein said impeller is formed of an aluminum alloy containing at least magnesium and silicone.

4. The impeller as set forth in claim 1, wherein a third cross-sectional contour of the nine blades taken radially outward of the second cross-sectional contour has the following dimensions:

| Point No. | XP | YP | ZP |
|---|---|---|---|
| A | 0.0648 | −0.0158 | 2.5318 |
| B | 0.0805 | −0.0081 | 2.5416 |
| C | 0.0924 | −0.0097 | 2.5490 |
| D | 1.4994 | −2.0383 | 2.7512 |

| Point No. | XS | YS | ZS |
| --- | --- | --- | --- |
| A | 0.0648 | −0.0158 | 2.5318 |
| B | 0.0555 | −0.0323 | 2.5259 |
| C | 0.0558 | −0.0462 | 2.5258 |
| D | 1.4994 | −2.0383 | 2.7512 | all of the dimensions measured above having a tolerance in the range of +/−0.020 inch (+/0.0508 cm).

5. The impeller as set forth in claim 4, wherein a tip dimension of the impeller has the following cross-sectional dimensions:

| Point No. | XP | YP | ZP |
| --- | --- | --- | --- |
| A | 0.0120 | −0.0064 | 2.8313 |
| B | 0.0295 | 0.0000 | 2.8356 |
| C | 0.0418 | −0.0026 | 2.8401 |
| D | 1.2984 | −2.0055 | 3.0276 |

| Point No. | XS | YS | ZS |
| --- | --- | --- | --- |
| A | 0.0120 | −0.0064 | 2.8313 |
| B | 0.0012 | −0.0220 | 2.8311 |
| C | 0.0000 | −0.0350 | 2.8334 |
| D | 1.2984 | −2.0055 | 3.0276 | tolerances all of the dimensions measured above having a tolerance in the range of +/−0.020 inch (+/0.0508 cm).

6. The impeller as set forth in claim 5, wherein said second cross-section is taken at 20-30% of a maximum distance between the hub outer surface and a tip of the impeller.

7. The impeller as set forth in claim 1, the first cross-sectional contour having the following additional dimensions:

| XP | YP | ZP |
| --- | --- | --- |
| 0.4104 | −0.0744 | 1.0230 |
| 0.5038 | −0.1533 | 1.0774 |
| 0.6892 | −0.3110 | 1.1723 |
| 1.1829 | −0.7495 | 1.3528 |
| 1.6731 | −1.2210 | 1.4292 |
| 2.1523 | −1.7087 | 1.3958 |
| 2.4413 | −2.0064 | 1.3243 |
| 2.5550 | −2.1228 | 1.2858 |
| 2.6094 | −2.1837 | 1.2620 |

| XS | YS | ZS |
| --- | --- | --- |
| 0.3613 | −0.1371 | 1.0156 |
| 0.4544 | −0.2156 | 1.0687 |
| 0.6392 | −0.3724 | 1.1612 |
| 1.1312 | −0.8080 | 1.3350 |
| 1.6198 | −1.2753 | 1.4044 |
| 2.0972 | −1.7575 | 1.3644 |
| 2.3850 | −2.0514 | 1.2895 |
| 2.4982 | −2.1662 | 1.2498 |
| 2.5587 | −2.2215 | 1.2297 | and the second cross-sectional contour having the following additional dimensions:

| XP | YP | ZP |
| --- | --- | --- |
| 0.3437 | −0.0635 | 1.3581 |
| 0.4284 | −0.1411 | 1.4106 |
| 0.5959 | −0.2965 | 1.5035 |
| 1.0403 | −0.7288 | 1.6860 |
| 1.4810 | −1.1931 | 1.7748 |
| 1.9118 | −1.6747 | 1.7655 |
| 2.1717 | −1.9709 | 1.7136 |
| 2.2740 | −2.0874 | 1.6838 |
| 2.3187 | −2.1471 | 1.6576 |

| XS | YS | ZS |
| --- | --- | --- |
| 0.3024 | −0.1245 | 1.3255 |
| 0.3878 | −0.2018 | 1.3751 |
| 0.5565 | −0.3563 | 1.4627 |
| 1.0036 | −0.7843 | 1.6331 |
| 1.4465 | −1.2422 | 1.7117 |
| 1.8793 | −1.7160 | 1.6936 |
| 2.1403 | −2.0069 | 1.6374 |
| 2.2430 | −2.1212 | 1.6061 |
| 2.2974 | −2.1772 | 1.5933 | all of the dimensions measured above having a tolerance in the range of +/−0.020 inch (+/0.0508 cm).

8. A fan system comprising:
an electric motor having a shaft, said shaft being fixed to rotate an impeller, and said electric motor and said impeller received within a housing having a fan inlet and a fan outlet; and said impeller having a hub extending along an X axis of rotation and having a hub outer surface;
a dimension X measured along the X axis of rotation defining a centerline, a radial dimension Z defining a Z axis in the radial dimension Z, and a Y axis defined laterally and perpendicular to the Z axis, and spaced by 90 degrees from the Z axis,
further comprising nine blades extending radially outwardly of the hub outer surface, and having a first cross-sectional contour and height at the hub outer surface as defined below, having a dimension Xs measured in the X direction and perpendicular to the Y axis and to a suction side and a dimension Xp measured in the X direction and perpendicular to the Y axis and to a pressure side and a dimension Yp measured in the Y direction perpendicular to the X axis and to a pressure side and a dimension Ys measured in the Y direction and perpendicular to the X axis to the suction side and a dimension Zp in the Z dimension in the radial dimension from the centerline to the pressure side and a dimension Zs measured in the Z direction and to the suction side, and with there being an origin for each of the nine blades, and all said origins being at a common location along the X axis, and at nine equally circumferentially spaced locations, with a point A defined at a leading edge, a point B being the closest point to the Y axis, and spaced from the leading edge, a point C being the closest point to the X axis, and spaced from the leading edge, and a point D being at a trailing edge, and having the following dimensions:

| Point No. | XP | YP | ZP |
| --- | --- | --- | --- |
| A | 0.3365 | −0.0643 | 0.9889 |
| B | 0.3568 | −0.5000 | 0.9945 |

-continued

| Point No. | XP | YP | ZP |
| --- | --- | --- | --- |
| C | 0.3732 | −0.0489 | 1.0013 |
| D | 2.5986 | −2.2174 | 1.2400 |

| Point No. | XP | YP | ZP |
| --- | --- | --- | --- |
| A | 0.2792 | −0.0541 | 1.3143 |
| B | 0.2960 | −0.0415 | 1.3262 |
| C | 0.3098 | −0.0399 | 1.3358 |
| D | 2.3186 | −2.1718 | 1.6250 | further, there being a second cross-sectional contour spaced from the hub outer surface in a radially outer direction having the following dimensions:

| Point No. | XS | YS | ZS |
| --- | --- | --- | --- |
| A | 0.3365 | −0.0643 | 0.9889 |
| B | 0.3274 | −0.0878 | 0.9903 |
| C | 0.3298 | −0.1047 | 0.9951 |
| D | 2.5986 | −2.2174 | 1.2400 |

| Point No. | XS | YS | ZS |
| --- | --- | --- | --- |
| A | 0.2792 | −0.0541 | 1.3143 |
| B | 0.2713 | −0.0756 | 1.3078 |
| C | 0.2733 | −0.0921 | 1.3081 |
| D | 2.3186 | −2.1718 | 1.6250 | all of the dimensions measured above having a tolerance in the range of +/−0.020 inch (+/0.0508 cm).

9. The fan system as set forth in claim 8, wherein the hub having an outer diameter along the hub outer surface with a first point taken at an axially forwardmost point, and measured in eleven equally data points and having X and Z dimensions as follows:

| Point No. | X | Z |
| --- | --- | --- |
| 1 | 0.3343 | 0.5800 |
| 2 | 0.2952 | 0.6167 |
| 3 | 0.2269 | 0.7005 |
| 4 | 0.2110 | 0.8497 |
| 5 | 0.5521 | 1.1387 |
| 6 | 1.3384 | 1.6773 |
| 7 | 2.1246 | 2.2159 |
| 8 | 2.7422 | 2.6317 |
| 9 | 2.9848 | 2.7235 |
| 10 | 3.1657 | 2.7481 |
| 11 | 3.2940 | 2.7500 | all of the dimensions measured above having a tolerance in the range of +/−0.020 inch (+/0.0508 cm).

10. The fan system as set forth in claim 8, wherein said impeller is formed of an aluminum alloy containing at least magnesium and silicone.

11. The fan system as set forth in claim 8, wherein a third cross-section of the nine blade taken radially outward of the second cross-section has the following dimensions:

| Point No. | XP | YP | ZP |
| --- | --- | --- | --- |
| A | 0.0648 | −0.0158 | 2.5318 |
| a | 0.0805 | −0.0081 | 2.5416 |
| C | 0.0924 | −0.0097 | 2.5490 |
| D | 1.4994 | −2.0383 | 2.7512 |

| Point No. | XS | YS | ZS |
| --- | --- | --- | --- |
| A | 0.0648 | −0.0158 | 2.5318 |
| B | 0.0555 | −0.0323 | 2.5259 |
| C | 0.0558 | −0.0462 | 2.5258 |
| D | 1.4994 | −2.0383 | 2.7512 | all of the dimensions measured above having a tolerance in the range of +/−0.020 inch (+/0.0508 cm).

12. The fan system as set forth in claim 8, wherein a tip dimension of the impeller has the following dimensions:

| Point No. | XP | YP | ZP |
| --- | --- | --- | --- |
| A | 0.0120 | −0.0064 | 2.8313 |
| B | 0.0295 | 0.0000 | 2.8356 |
| C | 0.0418 | −0.0026 | 2.8401 |
| D | 1.2984 | −2.0055 | 3.0276 |

| Point No. | XS | YS | ZS |
| --- | --- | --- | --- |
| A | 0.0120 | −0.0064 | 2.8313 |
| B | 0.0012 | −0.0220 | 2.8311 |
| C | 0.0000 | −0.0350 | 2.8334 |
| D | 1.2984 | −2.0055 | 3.0276 | all of the dimensions measured above having a tolerance in the range of +/−0.020 inch (+/0.0508 cm).

13. The fan system as set forth in claim 8, wherein said second cross-section is taken at 20-30% of a maximum distance between the hub outer surface and a tip of the impeller.

14. The fan system as set forth in claim 8, wherein said inlet is to be connected to receive air from an aircraft cabin and said outlet is to be connected to deliver air back into the aircraft cabin.

15. A method of replacing an impeller in a fan air recirculation system comprising the steps of:
removing an existing fan impeller from a fan system having an electric motor driving a shaft to drive the existing impeller, the existing impeller and the electric motor and shaft received within a housing having an inlet and an outlet; and
replacing the existing impeller with a replacement impeller,
the replacement impeller having a hub extending along an X axis of rotation and having a hub outer surface;
a dimension X measured along the X axis of rotation defining a centerline, a radial dimension Z defining a Z axis in the radial dimension, and a Y axis defined laterally and perpendicular to the Z axis, and spaced by 90 degrees from the Z axis,
further comprising nine blades extending radially outwardly of the hub outer surface, and having a first cross-sectional contour and height at the hub outer surface as defined below, having a dimension Xs measured in the X direction and perpendicular to a Y axis and to a suction side and a dimension Xp measured in the X direction and perpendicular to the Y axis and to a pressure side and a dimension Yp measured in the Y direction perpendicular to the X axis and to a pressure side and a dimension Ys measured in the Y direction and perpendicular to the X axis to the suction side and a dimension Zp in the Z dimension in the radial dimension from the centerline to the pressure side and a dimension Zs measured in the Z direction and to the suction side, and with there being an origin for each of the nine blades, and all said origins being at a common location along the X axis, and at nine equally circumferentially spaced locations, with a point A defined at a leading edge, a point B being the closest point to the Y axis, and spaced from the leading edge, a point C being the closest point to the X axis, and spaced from the leading edge, and a point D being at a trailing edge, and having the following dimensions:

| Point No. | XP | YP | ZP |
|---|---|---|---|
| A | 0.3365 | −0.0643 | 0.9889 |
| B | 0.3568 | −0.5000 | 0.9945 |
| C | 0.3732 | −0.0489 | 1.0013 |
| D | 2.5986 | −2.2174 | 1.2400 |

| Point No. | XS | YS | ZS |
|---|---|---|---|
| A | 0.3365 | −0.0643 | 0.9889 |
| B | 0.3274 | −0.0878 | 0.9903 |
| C | 0.3298 | −0.1047 | 0.9951 |
| D | 2.5986 | −2.2174 | 1.2400 | further, there being a second cross-sectional contour spaced from the hub outer surface in a radially outer direction having the following dimensions:

| Point No. | XP | YP | ZP |
|---|---|---|---|
| A | 0.2792 | −0.0541 | 1.3143 |
| B | 0.2960 | −0.0415 | 1.3262 |
| C | 0.3098 | −0.0399 | 1.3358 |
| D | 2.3186 | −2.1718 | 1.6250 |

| Point No. | XS | YS | ZS |
|---|---|---|---|
| A | 0.2792 | −0.0541 | 1.3143 |
| B | 0.2713 | −0.0756 | 1.3078 |
| C | 0.2733 | −0.0921 | 1.3081 |
| D | 2.3186 | −2.1718 | 1.6250 | and;
all of the dimensions measured above having a tolerance in the range of +/−0.020 inch (+/0.0508 cm).

16. The method as set forth in claim 15, wherein the hub having an outer diameter along the hub outer surface with a first point taken at an axially forwardmost point, and measured in eleven equally spaced data points and having X and Z dimensions as follows:

| Point No. | X | Z |
|---|---|---|
| 1 | 0.3343 | 0.5800 |
| 2 | 0.2952 | 0.6167 |
| 3 | 0.2269 | 0.7005 |
| 4 | 0.2110 | 0.8497 |
| 5 | 0.5521 | 1.1387 |
| 6 | 1.3384 | 1.6773 |
| 7 | 2.1246 | 2.2159 |
| 8 | 2.7422 | 2.6317 |
| 9 | 2.9848 | 2.7235 |
| 10 | 3.1657 | 2.7481 |
| 11 | 3.2940 | 2.7500 | all of the dimensions measured above having a tolerance in the range of +/−0.020 inch (+/0.0508 cm).

17. The method as set forth in claim 16, wherein said replacement impeller is formed of an aluminum alloy containing at least magnesium and silicone.

18. The method as set forth in claim 15, wherein a third cross-section of the nine blades taken radially outward of the second cross-section has the following dimensions:

| Point No. | XP | YP | ZP |
|---|---|---|---|
| A | 0.0648 | −0.0158 | 2.5318 |
| B | 0.0805 | −0.0081 | 2.5416 |
| C | 0.0924 | −0.0097 | 2.5490 |
| D | 1.4994 | −2.0383 | 2.7512 |

| Point No. | XP | YP | ZP |
|---|---|---|---|
| A | 0.0648 | −0.0158 | 2.5318 |
| B | 0.0805 | −0.0081 | 2.5416 |
| C | 0.0924 | −0.0097 | 2.5490 |
| D | 1.4994 | −2.0383 | 2.7512 | all of the dimensions measured above having a tolerance in the range of +/−0.020 inch (+/0.0508 cm).

19. The method as set forth in claim 15, wherein a tip dimension of the replacement impeller has the following cross-sectional contour dimensions:

| Point No. | XP | YP | ZP |
|---|---|---|---|
| A | 0.0120 | −0.0064 | 2.8313 |
| B | 0.0295 | 0.0000 | 2.8356 |
| C | 0.0418 | −0.0026 | 2.8401 |
| D | 1.2984 | −2.0055 | 3.0276 |

| Point No. | XS | YS | ZS |
|---|---|---|---|
| A | 0.0120 | −0.0064 | 2.8313 |
| B | 0.0012 | −0.0220 | 2.8311 |
| C | 0.0000 | −0.0350 | 2.8334 |
| D | 1.2984 | −2.0055 | 3.0276 | all of the dimensions measured above having a tolerance in the range of +/−0.020 inch (+/0.0508 cm).

20. The impeller as set forth in claim 19, wherein said second cross-sectional contour is taken at 20-30% of a maximum distance between the hub outer surface and a tip of the initially formed replacement impeller.

* * * * *